US011630481B2

(12) United States Patent
Egler

(10) Patent No.: US 11,630,481 B2
(45) Date of Patent: *Apr. 18, 2023

(54) MANAGING A TIME REFERENCE

(71) Applicant: Lytx, Inc., San Diego, CA (US)

(72) Inventor: Bernd Egler, Carlsbad, CA (US)

(73) Assignee: Lytx, Inc., San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/544,830

(22) Filed: Dec. 7, 2021

(65) Prior Publication Data
US 2022/0197333 A1 Jun. 23, 2022

Related U.S. Application Data

(63) Continuation of application No. 16/562,036, filed on Sep. 5, 2019, now Pat. No. 11,226,650.

(51) Int. Cl.
*G06F 1/14* (2006.01)
*G01S 19/34* (2010.01)
*G04G 7/00* (2006.01)
*G04G 3/02* (2006.01)
*G04G 3/04* (2006.01)
*G01S 19/23* (2010.01)

(52) U.S. Cl.
CPC ............. *G06F 1/14* (2013.01); *G01S 19/235* (2013.01); *G01S 19/34* (2013.01); *G04G 3/02* (2013.01); *G04G 3/04* (2013.01); *G04G 7/00* (2013.01)

(58) Field of Classification Search
CPC .......... G06F 1/14; G01S 19/235; G01S 19/34; G04G 3/02; G04G 3/04; G04G 7/00
USPC ................................................. 713/400, 503
See application file for complete search history.

(56) References Cited

U.S. PATENT DOCUMENTS

| 5,629,708 | A | 5/1997 | Rodal |
|---|---|---|---|
| 5,798,732 | A | 8/1998 | Eschenbach |
| 5,893,044 | A | 4/1999 | King |
| 6,121,923 | A | 9/2000 | King |
| 6,236,360 | B1 | 5/2001 | Rudow |
| 6,236,940 | B1* | 5/2001 | Rudow ................. G01S 19/071 701/300 |
| 7,532,159 | B2* | 5/2009 | Zhi ........................ G01S 19/23 342/357.62 |
| 9,456,431 | B2 | 9/2016 | Ling |
| 11,226,650 | B1* | 1/2022 | Egler .................... G01S 19/235 |
| 2003/0083814 | A1* | 5/2003 | Gronemeyer .......... G04G 19/12 701/478 |

(Continued)

OTHER PUBLICATIONS

Anonymous, "Tiny Real-Time Clock/calendar with alarm function, battery switch-over, time stamp input, and I2C-bus" NXP Semiconductors, Rev 4.1, Nov. 27, 2015.

*Primary Examiner* — Paul R. Myers
(74) *Attorney, Agent, or Firm* — Van Pelt, Yi & James LLP

(57) ABSTRACT

A system for managing a time reference includes a real-time clock, an interface, and a processor. The real-time clock store an RTC time. The interface is configured to receive a GPS time and a cellular time. The processor is configured to: indicate to start a time-speed adjustment loop; determine a true time based at least in part on the GPS time and the cellular time; determine an error between the true time and the RTC time; determine an RTC speed calibration adjustment based at least in part on the error; and adjust the real-time clock speed based at least in part on the RTC speed calibration adjustment.

19 Claims, 10 Drawing Sheets

(56) References Cited

U.S. PATENT DOCUMENTS

| | | |
|---|---|---|
| 2003/0187575 A1 | 10/2003 | King |
| 2005/0195105 A1 | 9/2005 | McBurney |
| 2007/0035632 A1 | 2/2007 | Silvernail |
| 2007/0268180 A1 | 11/2007 | Zhi |
| 2007/0285309 A1 | 12/2007 | Atkinson |
| 2009/0016170 A1 | 1/2009 | Tanaka |
| 2009/0222685 A1 | 9/2009 | Foster |
| 2009/0322606 A1 | 12/2009 | Gronemeyer |
| 2010/0073228 A1 | 3/2010 | Smith |
| 2010/0250129 A1 | 9/2010 | Babitch |
| 2010/0295623 A1 | 11/2010 | Gronemeyer |
| 2011/0185214 A1 | 7/2011 | Luskind |
| 2012/0151244 A1 | 6/2012 | Ling |
| 2013/0006435 A1 | 1/2013 | Berrios |
| 2016/0224054 A1 | 8/2016 | Lin |
| 2017/0140645 A1 | 5/2017 | Balid |
| 2019/0238153 A1 | 8/2019 | Minamoto |
| 2019/0346506 A1 | 11/2019 | Schamber |
| 2020/0059725 A1 | 2/2020 | Maly |

* cited by examiner

MANAGING A TIME REFERENCE

CROSS REFERENCE TO OTHER APPLICATIONS

This application is a continuation of U.S. patent application Ser. No. 16/562,036 entitled MANAGING A TIME REFERENCE filed Sep. 5, 2019, which is incorporated herein by reference for all purposes.

BACKGROUND OF THE INVENTION

Modern vehicles (e.g., airplanes, boats, trains, cars, trucks, etc.) can include a vehicle event recorder in order to better understand the timeline of an anomalous event (e.g., an accident). A vehicle event recorder typically includes a set of sensors, e.g., video recorders, audio recorders, accelerometers, gyroscopes, vehicle state sensors, GPS (global positioning systems), etc., that report data, which is used to determine the occurrence of an anomalous event. Sensor data is associated with time data in order to identify events occurring simultaneously, distinguish cause and effect, etc. In order for the time data to be usable it needs to be as accurate as possible.

BRIEF DESCRIPTION OF THE DRAWINGS

Various embodiments of the invention are disclosed in the following detailed description and the accompanying drawings.

DETAILED DESCRIPTION

Figure 1:
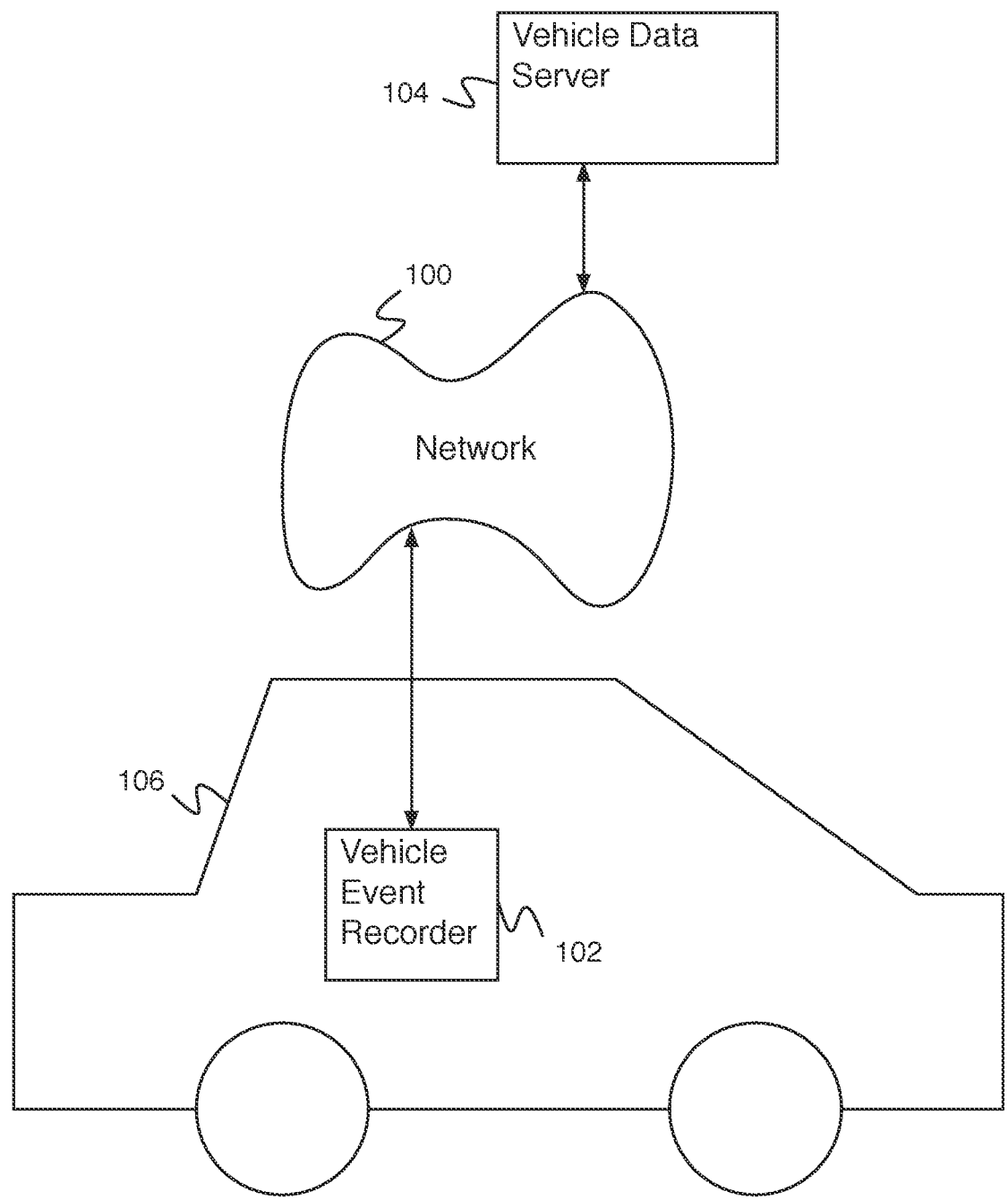
FIG. 1 is a block diagram illustrating an embodiment of a system including a vehicle event recorder.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for managing a time reference comprises a real-time clock, wherein the real time clock stores a real-time clock (RTC) time, an interface configured to receive a global positioning system (GPS) time and a cellular time, and a processor configured to indicate to start a time-speed adjustment loop, determine a true time based at least in part on the GPS time and the cellular time, determine an error between the true time and the RTC time, determine an RTC speed calibration adjustment based at least in part on the error, and adjust the real-time clock based at least in part on the RTC speed calibration adjustment.

A system for managing a time reference comprises a real-time clock. The real-time clock comprises a hardware module for tracking the current time. For example, the real-time clock comprises an oscillator (e.g., a crystal oscillator) and hardware for tracking the current time using the oscillator as a time reference. The real-time clock is subject to error due to manufacturing tolerances, due to aging, and due to temperature changes. Thus the real-time clock requires periodic calibration in order to maintain an accurate time. When a time reference is received, it is used to tune the rate of the real-time clock (e.g., speeding the real-time clock in the event the time reference is ahead in time of the real-time clock or slowing the real-time clock in the event the time reference is behind in time of the real-time clock) rather than directly setting the time stored by the real-time clock to that of the time reference, in order to avoid anomalous data events that are possible with jumps in the time stored by the real-time clock. A feedback loop is created wherein a time stamp from a previous cycle is compared with a true time determined from one or more time references. A feedback controller (e.g., a proportional-integral-derivative (PID) controller, a proportional-integral (PI) controller, etc.) determines calibration data based on the error signal, and the calibration data is provided to the real-time clock to change its rate of time passage. For example, a real-time clock hardware comprises a calibration input for calibrating its rate of time passage slightly up or down in order to account for error. The one or more time references comprise a time received associated with global positioning system (GPS) data, associated with cellular data (e.g., associated with cellular network), or a time received in any other appropriate way. In various embodiments, determining a true time comprises selecting a time reference, averaging time references, determining a median time reference, determining an average time reference, determining a set of time references within a threshold time of a median time reference, determining a set of time references within a threshold time of an average time reference, etc. The system for managing a time reference improves the computer system by tuning the system clock reference on the fly without the possibility of creating an anomalous time jump in the stored data. The system clock reference is updated using a true time determined from a received set of time references including a GPS time reference and a cellular time reference.

FIG. 1 is a block diagram illustrating an embodiment of a system including a vehicle event recorder. Vehicle event recorder system 102 comprises a vehicle event recorder mounted in a vehicle (e.g., a car, a truck, a trailer associated with a semi truck, a van, a bus, a commercial vehicle, etc.). Vehicle event recorder system 102 comprises a vehicle event recorder and sensor systems. The sensor systems comprise a set of sensors, for example, one or more video recorders, audio recorders, accelerometers, gyroscopes, vehicle sensors, proximity sensors, a GPS, outdoor temperature sensors, moisture sensors, laser line tracker sensors, sound navigation and ranging systems (SONAR), light detection and ranging systems (LIDAR), range finder sensors, etc. Vehicle sensors comprise internal vehicle sensors—for example, a speedometer, an accelerator pedal sensor, a brake pedal sensor, an engine revolutions per minute (RPM) sensor, an engine temperature sensor, a headlight sensor, an airbag deployment sensor, driver and passenger seat weight sensors, an anti-locking brake sensor, traction control system sensors, drive wheel speed sensors, shocks sensors, an engine exhaust sensor, a gear position sensor, a cabin equipment operation sensor, etc. Vehicle event recorder system 102 additionally comprises a real-time clock for maintaining the current time. Vehicle event recorder 102 comprises a system for receiving and processing sensor data. In some embodiments, vehicle event recorder 102 captures data (e.g., collects data, stores received data, etc.) in response to a trigger—for example, a trigger associated with a trigger threshold. Capturing data in response to a trigger comprises receiving data, processing the data, determining to capture more data (e.g., by determining that a processed data value is greater than a threshold), and capturing more data. Data stored by vehicle event recorder 102 can be associated with a time of capture. For example, a time of capture determined from the real-time clock, from a central processing unit (CPU) time (e.g., a time maintained by a processor of the vehicle event recorder), etc.

Processing sensor data comprises filtering data, identifying patterns in data, detecting events, etc. Vehicle event recorder 102 is mounted on vehicle 106 in any appropriate location, for example the chassis, the front grill, the dashboard, the windshield, the rear-view mirror, the rear window or wall, the floor, etc. There are times when vehicle event recorder system 102 comprises multiple units mounted in different locations within vehicle 106 instead of a single unit, particularly when there are space constraints for a given location (e.g., behind the rear view mirror) and more space is required to house electronic components. Vehicle event recorder system 102 comprises a communications system for communicating with network 100.

Network 100 comprises a network for communications. Network 100 comprises one or more of a wireless network, a wired network, a cellular network, a Code Division Multiple Access (CDMA) network, a Global System for Mobile Communication (GSM) network, a Long-Term Evolution (LTE) network, a Universal Mobile Telecommunications System (UMTS) network, a Worldwide Interoperability for Microwave Access (WiMAX) network, a Dedicated Short-Range Communications (DSRC) network, a WiFi, a local area network, a wide area network, the Internet, etc. There are instances when network 100 comprises multiple networks, for instance, multiple interconnected networks spanning different regions, networks operating at different times, overlaid networks with different access permissions, networks with different bandwidth, etc. Different networks comprising network 100 typically comprise different bandwidth cost (e.g., a wired network has a very low cost, a wireless Ethernet connection has a moderate cost, a cellular data network has a high cost). In some embodiments, network 100 has a different cost at different times (e.g., a higher cost during the day and a lower cost at night). Vehicle event recorder system 102 communicates with vehicle data server 104 via network 100. Vehicle data server 104 receives data, processes data, stores data, requests more data, provides stored data, etc.

For example, vehicle event recorder 102 comprises a system for managing a time reference, comprising a real-time clock, wherein the real time clock stores a real-time clock (RTC) time, an interface configured to receive a GPS time and a cellular time, and a processor configured to indicate to start a time-speed adjustment loop, determine a true time based at least in part on the GPS time and the cellular time, determine an error between the true time and the RTC time, determine an RTC speed calibration adjustment based at least in part on the error, and adjust the real-time clock based at least in part on the RTC speed calibration adjustment.

Figure 2:
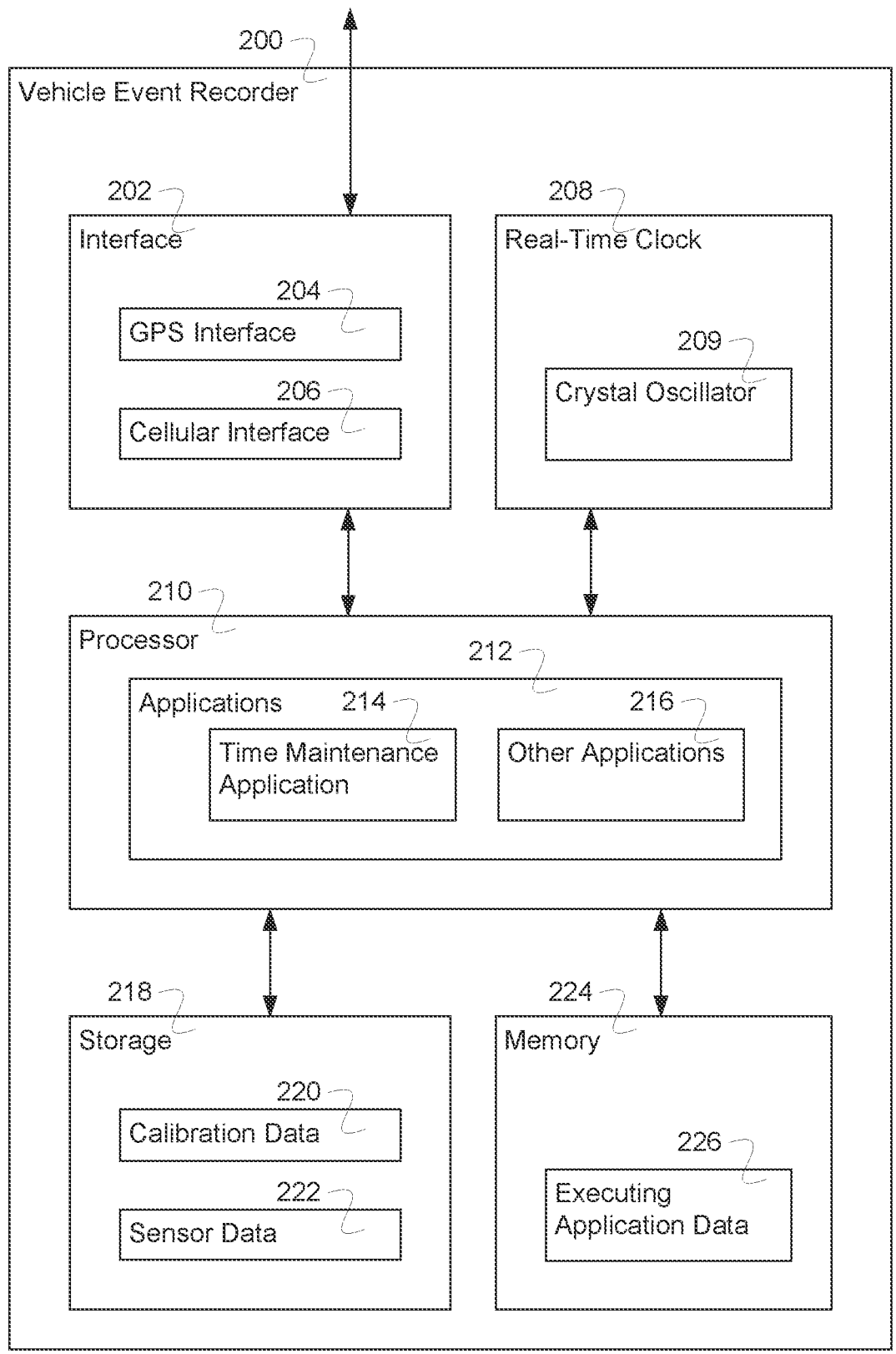
FIG. 2 is a block diagram illustrating an embodiment of a vehicle event recorder.

FIG. 2 is a block diagram illustrating an embodiment of a vehicle event recorder. In some embodiments, vehicle event recorder 200 comprises vehicle event recorder 102 of FIG. 1. In the example shown, vehicle event recorder 200 comprises interface 202. Interface 202 comprises an interface for communicating with external systems using a network. For example, interface 202 comprises an interface for communicating with a vehicle data server (e.g., for providing sensor data, for providing indications of anomalous events, etc.), a cloud system, etc. Interface 202 comprises GPS interface 204 for receiving GPS data and cellular interface 206 for receiving cellular data. For example, interface 202 is configured to receive GPS time data via GPS interface 204 and cellular time data via cellular interface 206. Vehicle event recorder 200 comprises real-time clock 208 for maintaining a current time. Real-time clock 208 stores and maintains an RTC time. For example, real-time clock 208 comprises an oscillator (e.g., crystal oscillator 209) or other time reference for updating the RTC time. In various embodiments, crystal oscillator 209 comprises one of the following: a first crystal oscillator comprising a +−20 parts per million (e.g., ppm) manufacturing tolerance, a −85 ppm /50° C. temperature tolerance, and a +−30 ppm/10 year aging tolerance, for a total tolerance of 135 ppm; a second crystal oscillator comprising a +−20 parts per million (e.g., ppm) manufacturing tolerance, a −75 ppm/50° C. temperature tolerance, and a +−30 ppm /10 year aging tolerance, for a total tolerance of 125 ppm; a third crystal oscillator comprising a +−20 parts per million (e.g., ppm) manufacturing tolerance, a −85 ppm /50° C. temperature tolerance, and a +−30 ppm/10 year aging tolerance, for a total tolerance of 135 ppm; or any other appropriate oscillator. Real-time clock 208 comprises at least an output for providing the current time, an input for resetting the current time, and an input for tuning the rate of RTC time passage (e.g., to correct for error). In some embodiments, real time clock 208 comprises a tuning adjustment range of −275 to 277 ppm. The tuning adjustment range is larger than the anticipated tolerance, allowing all tolerance errors to be corrected through tuning. Real-time clock 208 communicates with processor 210 to provide processor 210 with the current time, to receive a true time update, to receive tuning data, or to communicate any other appropriate data. Processor 210 comprises a processor for executing applications 212. Applications 212 comprises time maintenance application 214 and other applications 216. Time maintenance application 214 comprises an application for maintaining an accurate time. For example, time maintenance application 214 comprises an application configured to indicate to start a time-speed adjustment loop, determine a true time based at least in part on the GPS time and the cellular time, determine an error between the true time and the RTC time, determine an RTC speed calibration adjustment based at least in part on the error, and adjust the real-time clock based at least in part on the RTC speed calibration adjustment.

Other applications 216 comprise any other appropriate applications (e.g., a data collection application, a data viewing application, a driver health determination application, a data analysis application, etc.). Vehicle event recorder 200 additionally comprises storage 218. Storage 218 comprises calibration data 220 and sensor data 222. Calibration data 220 comprises calibration data for calibrating real-time clock 208 (e.g., calibration constants, feedback constants, feedback system configuration data, etc.). Sensor data 222 comprises data collected by one or more sensors. For example, sensor data 222 comprises data associated with a time stamp. Vehicle event recorder 200 additionally comprises memory 224. Memory 224 comprises executing application data 226 comprising data associated with applications 212.

Figure 3:
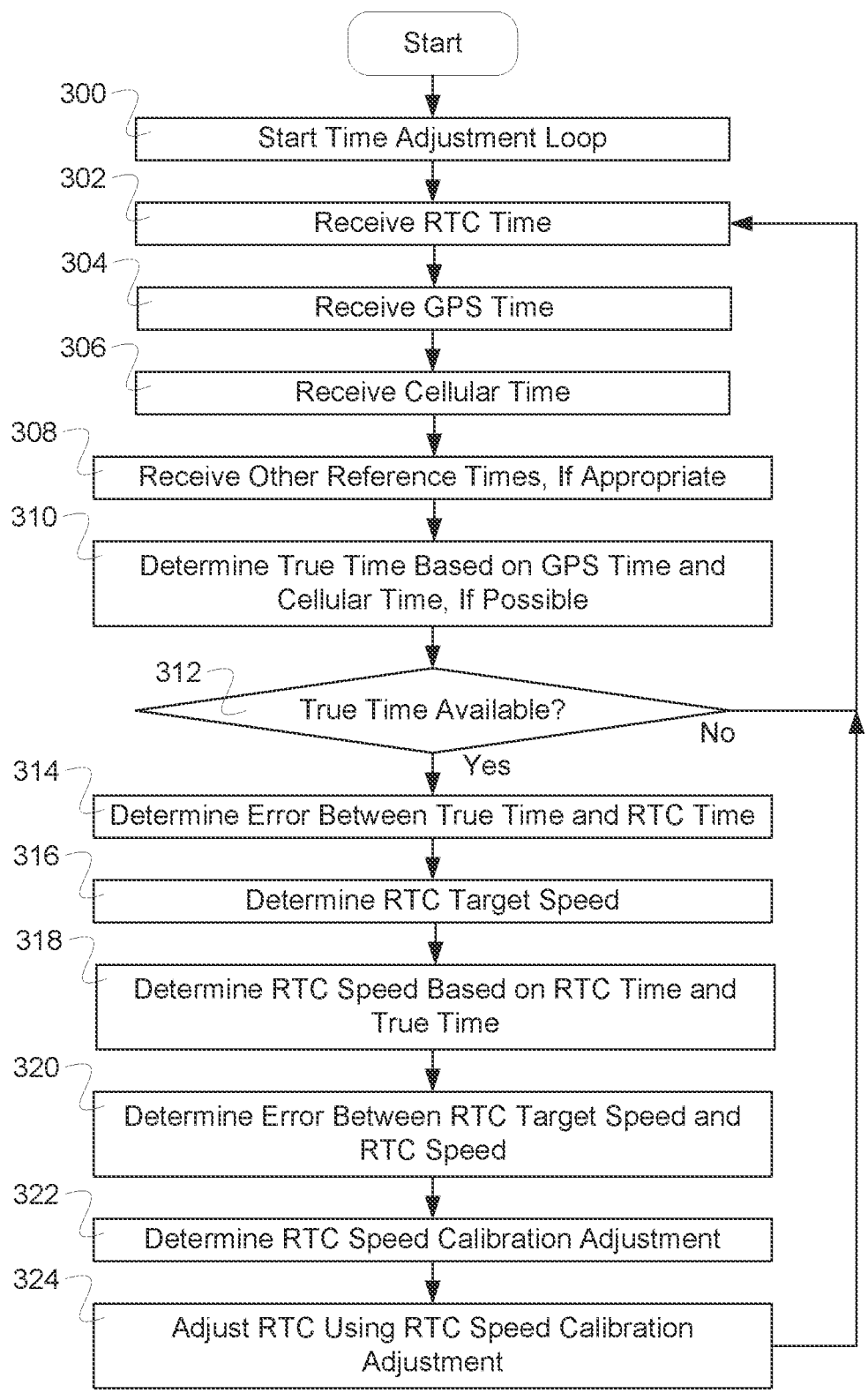
FIG. 3 is a flow diagram illustrating an embodiment of a process for managing a time reference.

FIG. 3 is a flow diagram illustrating an embodiment of a process for managing a time reference. In some embodiments, the process of FIG. 3 is executed by vehicle event recorder 102 of FIG. 1. In the example shown, in 300, a time-speed adjustment loop is started. In 302, an RTC time is received. For example, an RTC time is read from the real-time clock and is received and stored from the real-time clock (e.g., at a processor). In 304, a GPS time is received. For example, a GPS time is received from a GPS network. In 306, a cellular time is received. For example, a cellular time is received from a cellular network. In 308, other reference times are received, if appropriate. For example, other reference times are received if available. In some embodiments, no other reference times are received. In some embodiments, one or more other reference times are received. Other reference times comprise local area network reference times, offboard real-time clock reference times, internet time server reference times, etc. In 310, a true time is determined based on the GPS time and the cellular time, if possible. For example, a true time comprises a best guess of an objectively correct time based at least in part on the received versions of time (e.g., GPS time, cellular time, and/or other time references). In 312, it is determined whether a true time is available. In response to determining that a true time is not available, control passes to 302. In response to determining that a true time is available, control passes to 314. In 314, an error between the true time and the RTC time is determined. In 316, an RTC target speed is determined based at least in part on the error. For example, the RTC target speed is determined using a feedback controller. In 318, the RTC speed is determined based on the RTC time and the true time. In 320, the error between the RTC target speed and the RTC speed is determined. In 322, the RTC speed calibration adjustment is determined. In 324, the RTC is adjusted using the RTC speed calibration adjustment, and control passes to 302.

Figure 4:
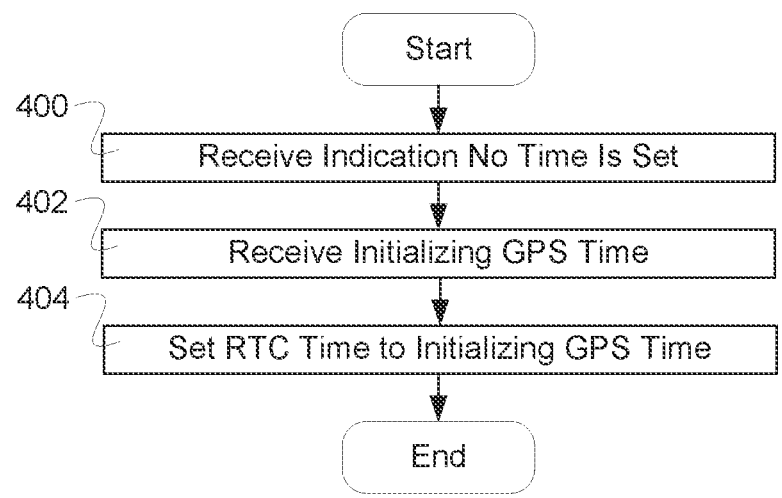
FIG. 4 is a flow diagram illustrating an embodiment of a process for initializing a real-time clock.

FIG. 4 is a flow diagram illustrating an embodiment of a process for initializing a real-time clock. In some embodiments, the process of FIG. 4 is executed by vehicle event recorder 102 of FIG. 1 upon initial turn-on. In the example shown, in 400, a no time is set indication is received. In 402, an initializing GPS time is received. In 404, the RTC time is set to the initializing GPS time.

Figure 5:
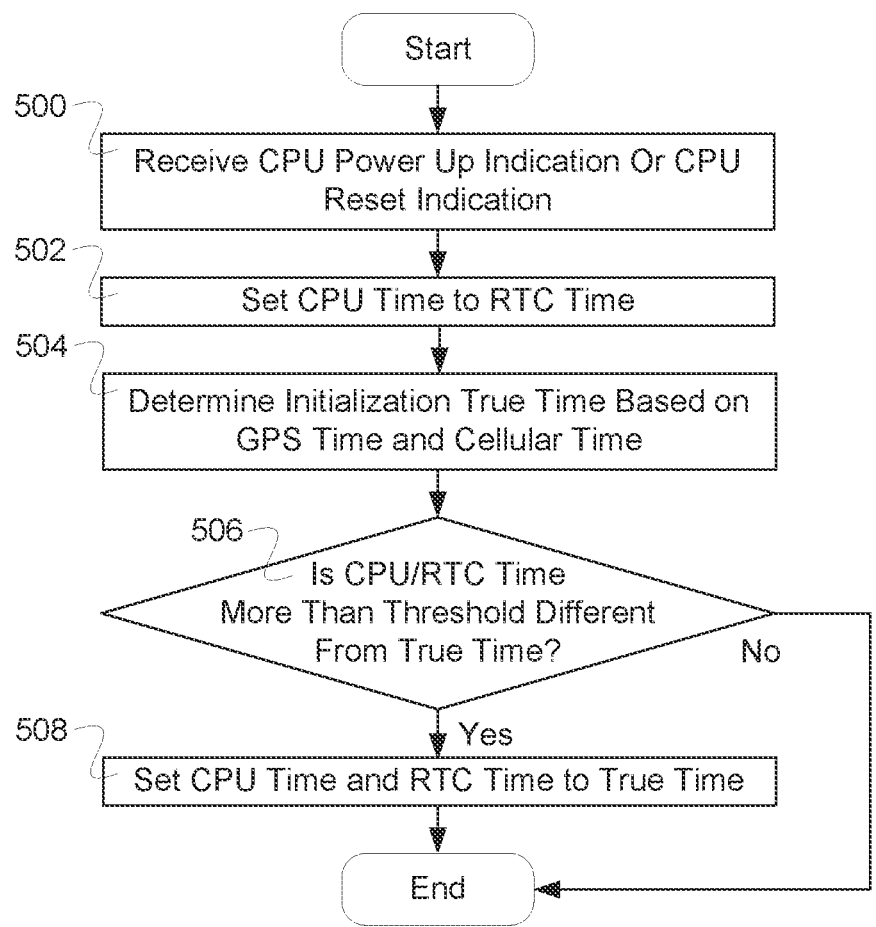
FIG. 5 is a flow diagram illustrating an embodiment of a process for initializing a central processing unit (CPU) clock.

FIG. 5 is a flow diagram illustrating an embodiment of a process for initializing a central processing unit (CPU) clock. In some embodiments, the process of FIG. 5 is executed by vehicle event recorder 102 of FIG. 1 upon CPU powerup or CPU reset. For example, the processor is configured to maintain a CPU time. In the example shown, in 500, a CPU powerup indication or a CPU reset indication is received. In 502, the CPU time is set to the RTC time (e.g., the RTC time stored by a real-time clock). In 504, an initialization true time is determined based at least in part on the GPS time and the cellular time. In 506, it is determined whether the CPU/RTC time is more than a threshold different from the true time. In response to determining that the CPU/RTC time is not more than a threshold different from the true time, the process ends. In response to determining that the CPU/RTC time is more than a threshold different from the true time, control passes to 508. In 508, the CPU time and the RTC time are set to the true time.

In some embodiments, when the time-speed adjustment loop is running, the time should never be more than a threshold different from true time.

Figure 6A:
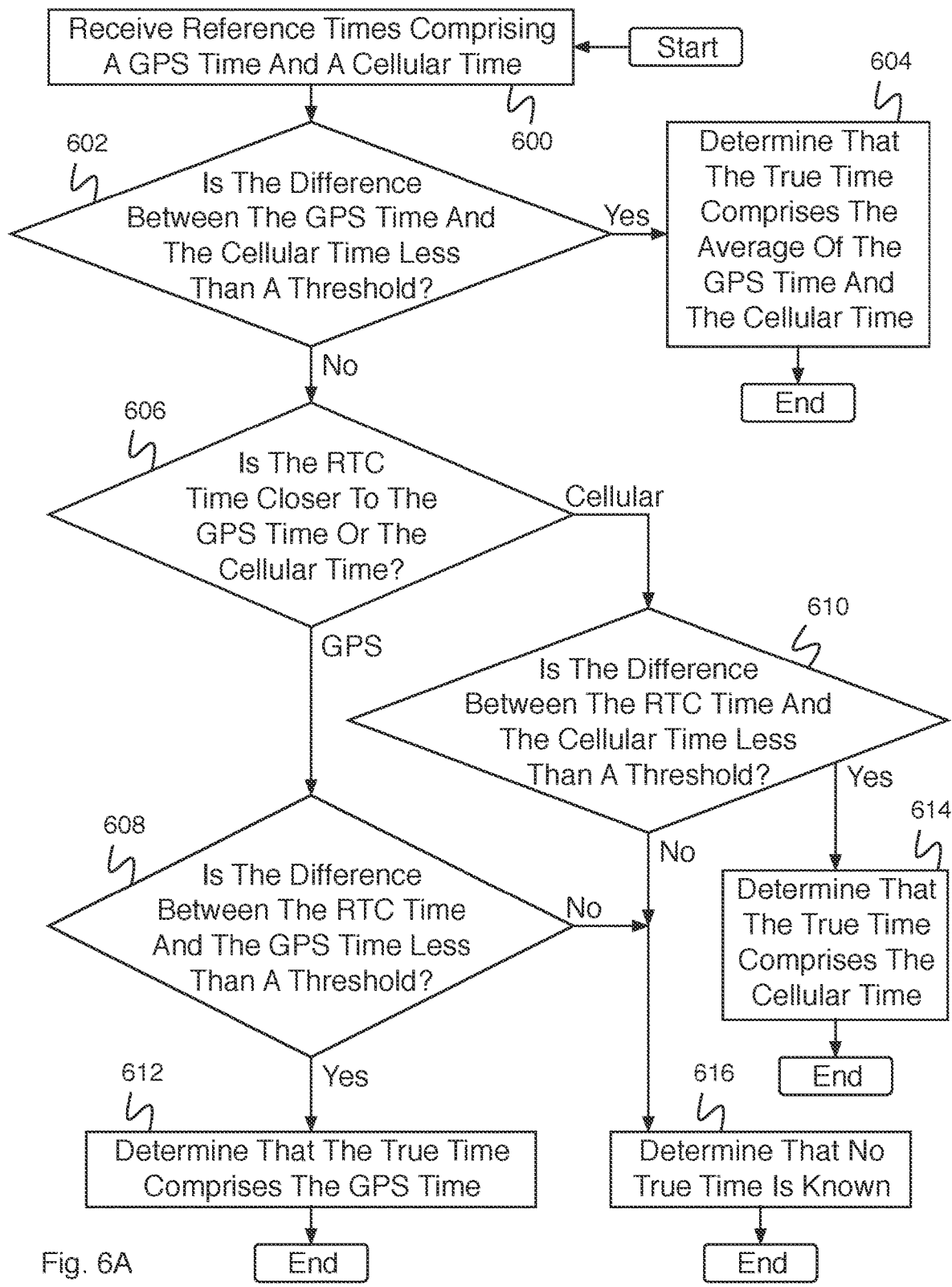
FIG. 6A is a flow diagram illustrating an embodiment of a process for determining a true time.

FIG. 6A is a flow diagram illustrating an embodiment of a process for determining a true time. In some embodiments, the process of FIG. 6A implements 310 of FIG. 3 in the event that no other reference times are received in 306. In the example shown, in 600, reference times comprising a GPS time and a cellular time are received. In 602, it is determined whether the difference between the GPS time and the cellular time is less than a threshold. In the event it is determined that the difference between the GPS time and the cellular time is less than a threshold, control passes to 604. In 604, it is determined that the true time comprises the average of the GPS time and the cellular time. The process then ends. In the event it is determined in 602 that the difference between the GPS time and the cellular time is not less than a threshold, control passes to 606. In 606, it is determined whether the RTC time is closer to the GPS time or the cellular time. In the event it is determined that the RTC time is closer to the GPS time, control passes to 608. In 608, it is determined whether the difference between the RTC time and the GPS time is less than a threshold. In the event it is determined that the difference between the RTC time and the GPS time is less than a threshold, control passes to 612. In 612, it is determined that the true time comprises the GPS time, and the process ends. In the event it is determined in 608 that the difference between the RTC time and the GPS time is not less than a threshold, control passes to 616. In the event it is determined in 606 that the RTC time is closer to the cellular time, control passes to 610. In 610, it is determined whether the difference between the RTC time and the cellular time is less than a threshold. In the event it is determined that the difference between the RTC time and the cellular time is less than a threshold, control passes to 614. In 614, it is determined that the true time comprises the cellular time, and the process ends. In the event it is determined in 610 that the difference between the RTC time and the cellular time is not less than a threshold, control passes to 616. In 616, it is determined that no true time is known.

Figure 6B:
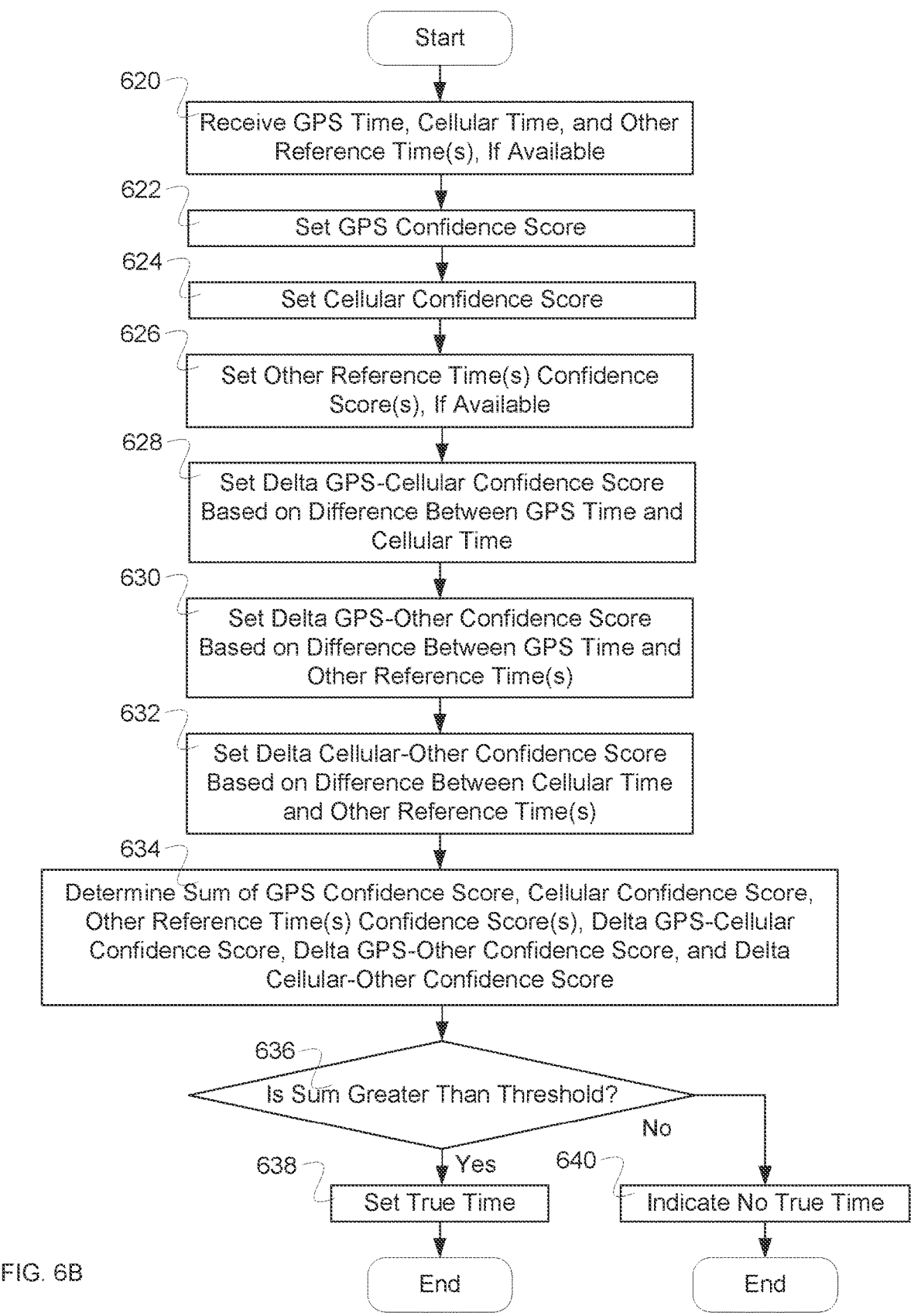
FIG. 6B is a flow diagram illustrating an embodiment of a process for determining a true time.

FIG. 6B is a flow diagram illustrating an embodiment of a process for determining a true time. In some embodiments, the process of FIG. 6B implements 310 of FIG. 3. In the example shown, in 620 GPS time, cellular time, and other reference time(s), if available, are received. In 622, a GPS confidence score is set. For example, a GPS confidence score is set to value (e.g., GPS confidence score is set to 8) based on the reliability of the time available from a GPS source. In 624, a cellular confidence score is set. For example, a cellular confidence score is set to value (e.g., cellular confidence score is set to 6) based on the reliability of the time available from a cellular source. In 626, an other reference time(s) confidence score is set. For example, an other reference time(s) confidence score is set to value (e.g., an other reference time(s) confidence score is set to 9) based on the reliability of the time available from the other reference time(s). In 628, delta GPS-Cellular confidence score is set based on difference between GPS time and cellular time. For example, the delta GPS-Cellular confidence score is set to value (e.g., delta GPS-Cellular confidence score is set to 5) based on the reliability of the time difference between the GPS time source and the cellular time source. In 630, delta GPS-Other confidence score is set based on difference between GPS time and other references time(s). For example, the delta GPS-Other confidence score is set to value (e.g., delta GPS-Other confidence score is set to 6) based on the reliability of the time difference between the GPS time source and the other reference time(s) source(s). In 632, delta Cellular-Other confidence score is set based on difference between cellular time and other reference time(s). For example, the delta Cellular-Other confidence score is set to value (e.g., delta Cellular-Other confidence score is set to 1) based on the reliability of the time difference between the cellular time source and the other reference time(s) source(s). In 634, a sum of the GPS confidence score, the cellular confidence score, the other reference time(s) confidence score(s), the delta GPS-Cellular confidence score, delta GPS-Other confidence score, and delta Cellular-Other confidence score is determined. In 636, it is determined whether the sum is greater than a threshold. In response to the sum being greater than a threshold, in 638 the true time is set, and the process ends. For example, the true time is set to a weighted average of the GPS time, the cellular time, and any other reference time(s), if available (e.g., true time=(GPS time*GPS confidence score+Cellular time*Cellular confidence score+other reference time*other reference time confidence score)/(GPS confidence score+Cellular confidence score+other reference time confidence score). In some embodiments, the weighted average of the GPS time, the cellular time, and any other reference time(s) is calculated prior to setting the true time to the weighted average. In response to the sum being not greater than a threshold, it is indicated in 640 that there is not true time, and the process ends.

Figure 7:
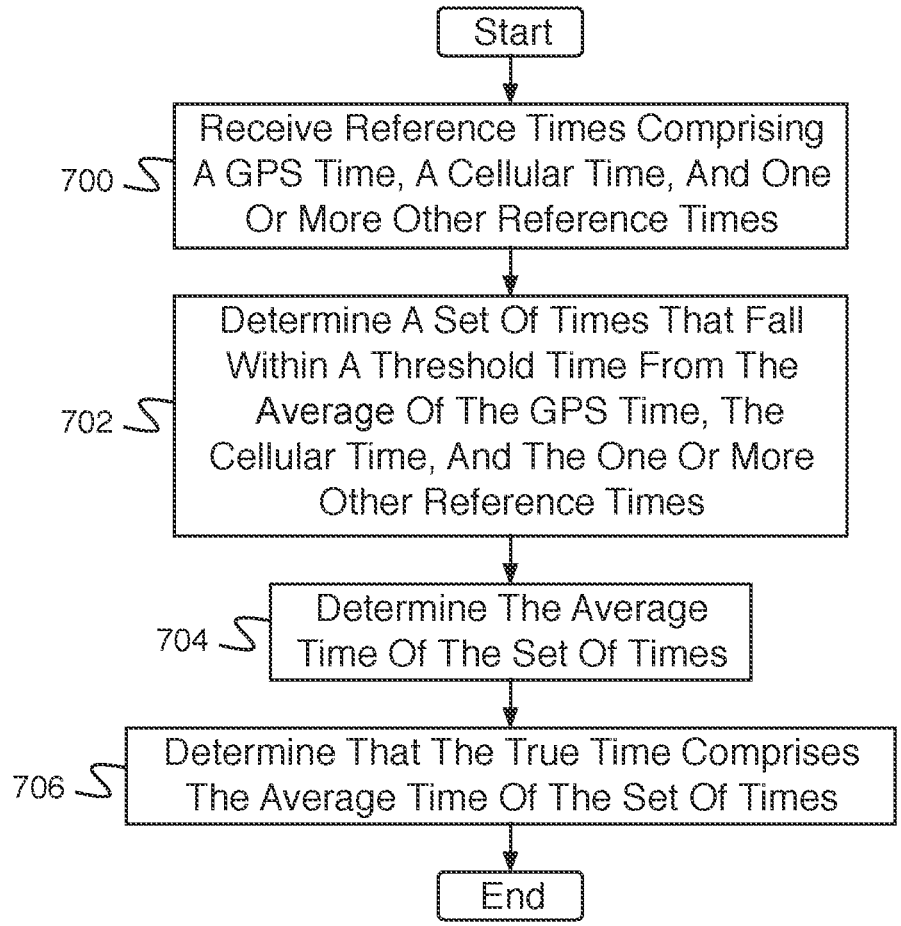
FIG. 7 is a flow diagram illustrating an embodiment of a process for determining a true time.

FIG. 7 is a flow diagram illustrating an embodiment of a process for determining a true time. In some embodiments, the process of FIG. 7 implements 310 of FIG. 3 in the event that one or more other reference times are received in 306. In the example shown, in 700, reference times comprising a GPS time, a cellular time, and one or more other reference times are received. In 702, a set of times that fall within a threshold time from the average of the GPS time, the cellular time, and the one or more reference times is determined. In 704, the average time of the set of times is determined. In 706, it is determined that the true time comprises the average time of the set of times.

Figure 8:
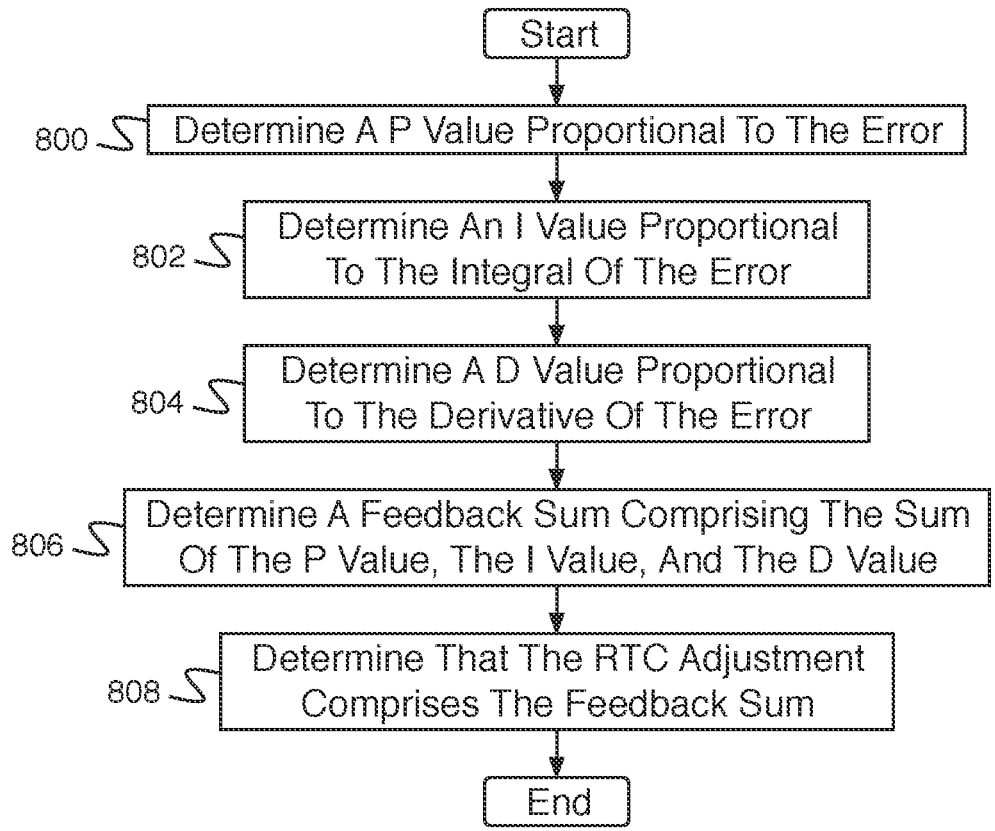
FIG. 8 is a flow diagram illustrating an embodiment of a process for determining an RTC adjustment based at least in part on an error.

FIG. 8 is a flow diagram illustrating an embodiment of a process for determining an RTC adjustment based at least in part on an error. In some embodiments, the process of FIG. 8 implements 316 of FIG. 3. In the example shown, in 800, a P value proportional to the error is determined. In 802, an I value proportional to the integral of the error is determined. In 804, a D value proportional to the derivative of the error is determined. For example, determination of the integral of the error and the derivative of the error require historical error measurements (e.g., previous measurements of the error in addition to the most recent measurement of the error). In 806, a feedback sum comprising the sum of the P value, the I value, and the D value is determined. In 808, it is determined that the RTC adjustment comprises the feedback sum. For example, determining the RTC adjustment comprises using a feedback controller comprising a PID controller or a PI controller (e.g., in the event the D value is zero).

Figure 9:
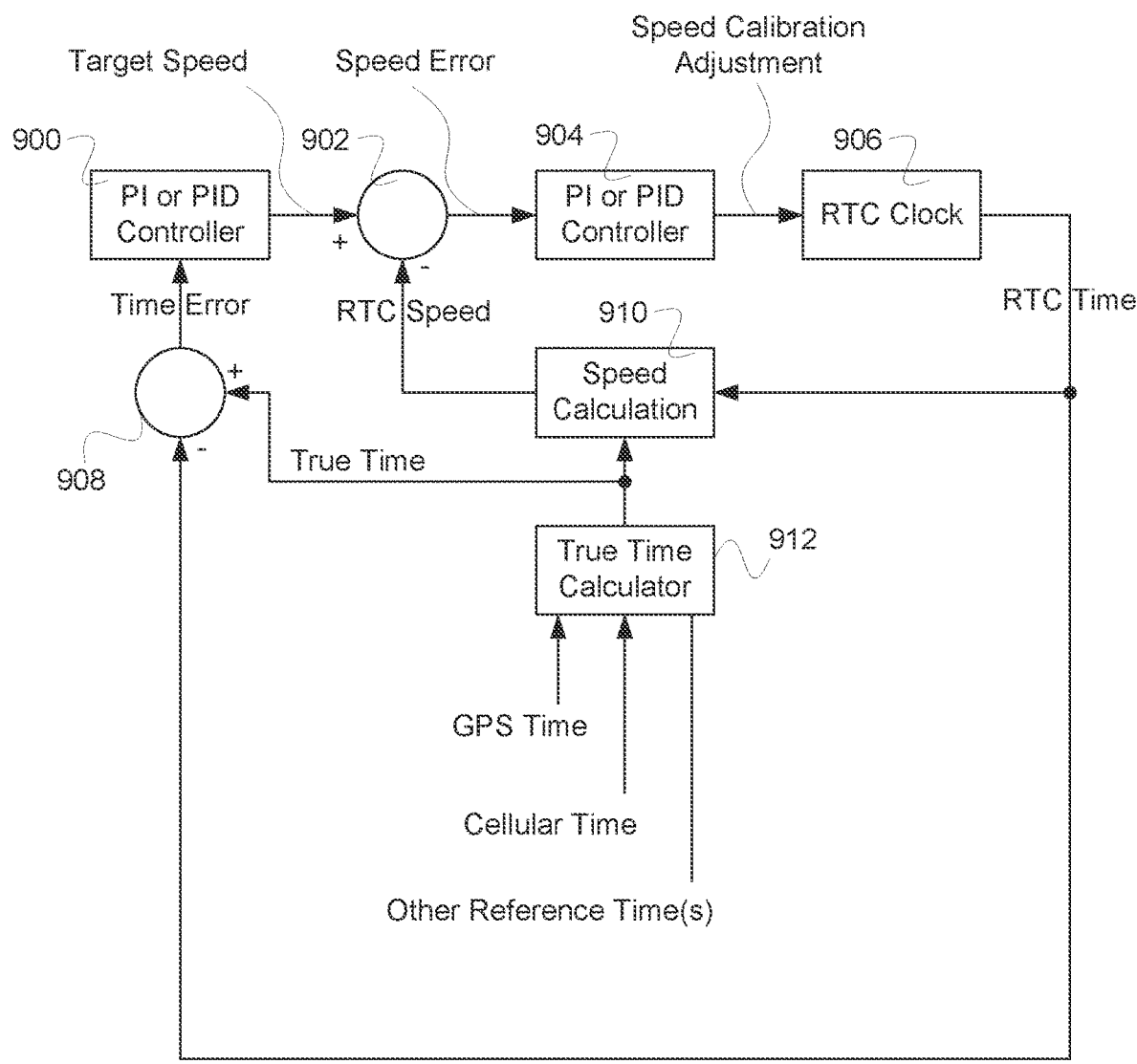
FIG. 9 is a block diagram illustrating an embodiment of a controller adjustment loop.

FIG. 9 is a block diagram illustrating an embodiment of a controller adjustment loop. In some embodiments, the controller adjustment loop is executed using a time maintenance application (e.g., time maintenance application 214). In the example shown, RTC clock 906 is provided to node 908 and speed calculation 910. Speed calculation 910 determines an RTC speed of RTC clock 906 based on a determined true time (e.g., from true time calculator 912). True time calculator 912 determines a true time considering GPS time, Cellular time, and other reference time(s), if available. True time is also provided to node 908. Node 908 determines a time error between the RTC time and the true time. The time error is fed to PI or PID controller 900 which determines a target speed. Node 902 determines a speed error using the difference between the target speed and the RTC speed. The speed error is fed to PI or PID controller 904 to generate a speed calibration adjustment. The speed calibration adjustment is fed to RTC clock 906 to adjust the speed of RTC clock 906.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A system for managing a time reference, comprising:
    a real-time clock, wherein the real-time clock stores an RTC time;
    an interface configured to receive a GPS time, one or more other reference times, and a cellular time; and
    a processor configured to:
        indicate to start a time-speed adjustment loop;
        determine a true time based at least in part on the GPS time and the cellular time, comprising to:
            determine whether a difference between the GPS time and the cellular time is greater than or equal to an outlier threshold; and
            in response to determination that the difference between the GPS time and the cellular time is greater than or equal to the outlier threshold:
                determine whether the GPS time or the cellular time is closer to the RTC time; and
                in response to a determination that the cellular time is closer to the RTC time:

determine whether a difference between the RTC time and the cellular time is less than or equal to a threshold; and
in response to a determination that the difference between the RTC time and the cellular time is less than or equal to the threshold, determine that the true time is not known;
determine an error between the true time and the RTC time;
determine an RTC speed calibration adjustment based at least in part on the error; and
adjust the real-time clock speed based at least in part on the RTC speed calibration adjustment.

2. The system of claim 1, wherein the real-time clock is further configured to set the RTC time to an initializing GPS time in response to a battery on indication.

3. The system of claim 2, wherein the processor is further configured to maintain a CPU time.

4. The system of claim 3, wherein the processor is further configured to, in response to a CPU powerup indication or a CPU reset indication, set the CPU time to the RTC time.

5. The system of claim 3, wherein the processor is further configured to determine an initialization true time based at least in part on the GPS time and the cellular time.

6. The system of claim 5, wherein the processor is further configured to set the RTC time to the initialization true time.

7. The system of claim 5, wherein the processor is further configured to, in response to the RTC time being more than a threshold difference from the CPU time, set the CPU time to the RTC time.

8. The system of claim 1, wherein determining the true time comprises:
in response to a determination that a difference between the GPS time and the cellular time is less than the outlier threshold, determining that the true time comprises an average of the GPS time and the cellular time.

9. The system of claim 1, wherein determining the true time comprises:
in response to a determination that a difference between the GPS time and the cellular time is greater than an outlier threshold:
determining whether the GPS time or the cellular time is closer to the RTC time;
in response to a determination that the GPS time is closer to the RTC time, determining that the true time comprises the GPS time; and
in response to a determination that the cellular time is closer to the RTC time, determining that the true time comprises the cellular time.

10. The system of claim 9, wherein the true time is determined to comprise the GPS time in response to the GPS time being less than a threshold difference from the RTC time and the GPS time is closer to the RTC time.

11. The system of claim 9, wherein the true time is determined to comprise the cellular time in response to the GPS time being less than a threshold difference from the RTC time and the cellular time is closer to the RTC time.

12. The system of claim 11, wherein determining the true time comprises:
determining a set of times that fall within a threshold time from an average of the GPS time, the cellular time, and the one or more other reference times;
determining the average time of the set of times; and
determining the true time comprises the average time of the set of times.

13. The system of claim 1, wherein the real-time clock is adjusted based at least in part on the RTC speed calibration adjustment at a predetermined interval.

14. The system of claim 13, wherein the predetermined interval comprises once a minute, once an hour, once a day, or once a week.

15. The system of claim 1, wherein a feedback controller is used to determine the RTC speed calibration adjustment based at least in part on the error.

16. The system of claim 15, wherein the feedback controller comprises a PID controller or a PI controller.

17. The system of claim 1, wherein the processor is further configured to store a time stamp.

18. A method for managing a time reference, comprising:
storing an RTC time;
receiving a GPS time, one or more other reference times, and a cellular time, comprising:
determining whether a difference between the GPS time and the cellular time is greater than or equal to an outlier threshold; and
in response to determination that the difference between the GPS time and the cellular time is greater than or equal to the outlier threshold:
determining whether the GPS time or the cellular time is closer to the RTC time; and
in response to a determination that the cellular time is closer to the RTC time:
determining whether a difference between the RTC time and the cellular time is less than or equal to a threshold; and
in response to a determination that the difference between the RTC time and the cellular time is less than or equal to the threshold,
determining that the true time is not known;
indicating, using a processor, to start a time-speed adjustment loop;
determining a true time based at least in part on the GPS time and the cellular time;
determining an error between the true time and the RTC time;
determining an RTC speed calibration adjustment based at least in part on the error; and
adjusting the real-time clock based at least in part on the RTC speed calibration adjustment.

19. A computer program product for managing a time reference, the computer program product being embodied in a non-transitory computer readable storage medium and comprising computer instructions for:
storing an RTC time;
receiving a GPS time, one or more other reference times, and a cellular time, comprising:
determining whether a difference between the GPS time and the cellular time is greater than or equal to an outlier threshold; and
in response to determination that the difference between the GPS time and the cellular time is greater than or equal to the outlier threshold:
determining whether the GPS time or the cellular time is closer to the RTC time; and
in response to a determination that the cellular time is closer to the RTC time:
determining whether a difference between the RTC time and the cellular time is less than or equal to a threshold; and
in response to a determination that the difference between the RTC time and the cellular time is less than or equal to the threshold, determining that the true time is not known;

indicating to start a time-speed adjustment loop;

determining a true time based at least in part on the GPS time and the cellular time;

determining an error between the true time and the RTC time;

determining an RTC speed calibration adjustment based at least in part on the error; and adjusting the real-time clock based at least in part on the RTC speed calibration adjustment.

* * * * *